United States Patent [19]
Baus, Jr. et al.

[11] 3,811,770
[45] May 21, 1974

[54] CAMERA

[76] Inventors: Rene Baus, Jr.; Lewis Epstein, both of 517 S. Carrollton Ave., New Orleans, La. 70118

[22] Filed: June 15, 1971

[21] Appl. No.: 153,385

[52] U.S. Cl.................................. 355/67, 240/1.3
[51] Int. Cl. ...................................... G03b 27/54
[58] Field of Search ......... 355/67, 71; 240/1.3, 2 C; 96/27

[56] References Cited
UNITED STATES PATENTS

| | | | |
|---|---|---|---|
| 3,331,688 | 7/1967 | Altman | 96/27 |
| 3,073,234 | 1/1963 | Roganti | 355/84 |
| 3,657,981 | 4/1970 | Benton | 95/18 |
| 3,198,097 | 8/1965 | Hine | 95/11 |

Primary Examiner—John M. Horan
Attorney, Agent, or Firm—Cushman, Darby & Cushman

[57] ABSTRACT

A method and apparatus for increasing the effective light gathering power of a camera, such as a document camera, wherein a plurality of lenses, such as spherical or cylindrical, are disposed adjacent the surface to be reproduced so that the lenses focus incident light onto a reduced document area from which it is reflected back through the transmitting lenses and directed to a film along paths which are relatively close to the path it travelled to the lenses. According to a further aspect of the invention film having a higher speed is disclosed with such lenses mounted adjacent the film for focusing incident light onto a reduced area of the film. Alternately or in addition, a layer of such lenses may be disposed adjacent the film for reflecting light passing through the film back along its path to the film. Other aspects of the invention are set forth below.

22 Claims, 6 Drawing Figures

PATENTED MAY 21 1974   3,811,770

INVENTORS
RENE BAUS, JR
LEWIS EPSTEIN
BY Cushman, Darby & Cushman
ATTORNEYS

INVENTORS
RENE BAUS, JR
LEWIS EPSTEIN

CAMERA

BRIEF DESCRIPTION OF THE PRIOR ART AND SUMMARY OF THE INVENTION

The invention relates to a method and apparatus for increasing the light gathering power of a camera, a camera for reproducing a surface pattern, a film having increased speed and a method of exposing film.

The usual method of reproducing a light pattern is to direct the pattern onto material of the type which responds to the intensity and/or frequency of light incident at each point by a chemical or other change which can be fixed or used in a developing process to make a permanent reproduction. This material is commonly termed photographic film and a number of different types are commonly available for use in different circumstances. With such material, the time required for exposing the film is a function of the intensity of the incident light. If that intensity is too low, as discussed below, it may not even be possible to expose the film at all.

The present invention relates to a method, camera and film wherein the light which is incident upon a piece of film to reproduce a pattern light is increased so as to reduce the time required to expose the film. This is accomplished in the camera of this invention as described below by providing a plurality of small lenses adjacent the surface to be reproduced, such as a document, so that each lens focuses the incident light onto an area of the document which is smaller than the area upon which the light would be incident in the absence of that lens. The lenses may be spherical, cylindrical or any other suitable shape.

Thus, when light rays strike a given lens, the rays are concentrated into a smaller roughly circular region on the document by virtue of the converging power of the lens, the average illumination of this circle being equal to the ratio of the flux which passes through the lens to the area of the circle. The flux that illuminates this small area of the document is reradiated with a substantial Lambertian distribution and is collected by the same lens which then returns the flux substantially along the path that it travelled to that lens. Because there is some spreading of the return beam away from the incident path, reradiated flux can be gathered by the entrance pupil of the camera and focused on a film. Since the illumination of the small area of the surface such as a document has been increased, since the reradiated luminance of each of these areas is increased in proportion, and since the lens element does not alter the luminance (except for absorption losses) the camera lens accordingly sees an enhancement of the luminance of the document. Further since the lenses are normally quite small, the information loss resulting from not impinging light on a portion of the document surface is minimal. In general, as discussed below, the gain in luminance of the document is equal roughly to the ratio of the cross-sectional area of the lens to the area of the illuminated circle.

As discussed below, the novel camera of this invention can be constructed in a number of different configurations. In a first embodiment, two light sources are preferably backed by reflectors including a retroreflecting surface which assists in directing the light from the source onto the document and in disposed behind the light sources and immediately adjacent the camera lens which focuses the light reflected from the document onto a suitable film. In a further embodiment, a reflecting lens system having a central obstruction adjacent which the light source is located is employed to focus the light gathered from the document onto the film. In yet another embodiment, a camera lens having an external pupil is employed and disposed in that pupil is a mirror which reflects light from a suitable source such as a mercury lamp onto a lens screen which then focuses it onto the document and returns it to the vicinity of the light source to be gathered by the camera lens and focused on the film.

According to a further aspect of the invention, a plurality of such small lens are disposed adjacent the film for directing incident light onto an equal number of reduced areas on the film and accordingly increasing the speed of the film. Alternately, or in addition to, a layer of such material is disposed adjacent the film for reflecting light passing through the film back along its same path. Methods for producing such lens screens are also discussed below.

Many other objects and purposes of the invention will become clear from the following detailed description of the drawings.

DETAILED DESCRIPTION OF THE DRAWINGS

Figure 1:
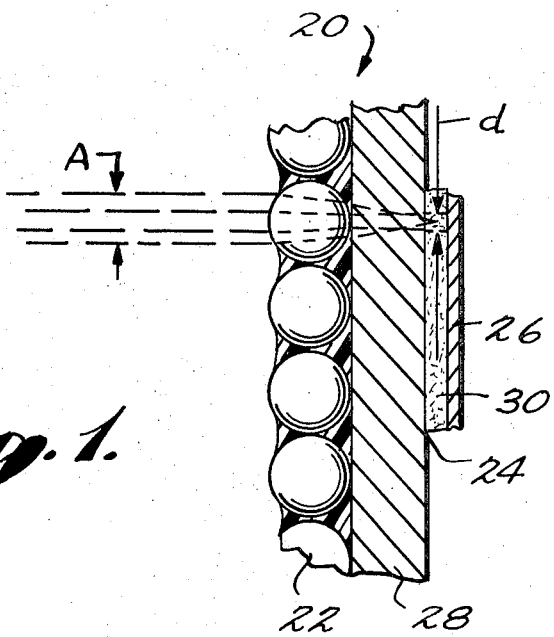
FIG. 1 shows a cutaway view of the novel film of this invention having a plurality of lenses disposed adjacent thereto for focusing incident light onto a reduced area of the film.

Reference is now made to FIG. 1 which shows a cutaway view of a film 20 which is comprised of a first layer 22, a second layer 24 and a third layer 26. The first layer 22 is comprised of a plurality of small lenses held in a plastic matrix so that the lenses are substantially contiguous as shown. The lenses may, for example, be small spheres of glass, plastic or other transparent material. Alternately, the lenses may be small cylindrical lenses which are mounted with their axes substantially parallel to the surface of the film. Any suitable lenses for focusing the light onto a reduced area of the film can be employed. The plastic matrix which holds the lenses may be opaque or a separate opaque layer may be added to layer 22 so that substantially no light penetrates layer 22 except through the lenses.

Layer 24 is comprised of a substrate 28 and a layer of sensitized emulsion 30 such as is conventionally used in any of a number of different types of films. The width of the plastic substrate 28 is chosen such that the plane containing the image circles of least confusion falls approximately in the center of the emulsion as shown. Alternately, one of the indices of refraction of the lenses or the width of the plastic matrix can be varied to accomplish this purpose. Each of the small lenses of layer 22 accordingly focuses incident light upon an area of the emulsion 30 which is substantially smaller in size than the area onto which the light would fall if the lenses were absent. Since the photographic density of an exposed and developed plate increases roughly as the logarithm of the product of the exposure time and the luminance (flux per unit area film) concentrating the same amount of flux on a reduced film area increases the resultant photographic density in the exposed area. In this instance, incident flux with a luminance with a F falls on the clear aperture (diameter A) of the lens and is concentrated into an emulsion area equal to the circle of least confusion (Diameter $d$) formed by the lenses. Thus, the increase in flux density, which is roughly the effective film speed, is increased by the factor K ($A^2/d^2$) where K is the transmission coefficient of the lens matrix composite and accounts for reflection and absorption losses introduced by use of the lenses. Typically, the speed of a film can be increased between 10 and 100 times by this approach.

To expose the film, light must be incident on the side of the film opposite emulsion 30 and the light is preferably collimated such as would be the case in a telescope projector, a camera, or the like. For contact printing, a collimated light source is preferably employed. In each of these examples, the entrance pupil of the exposure system can be defined and the final image formed in the emulsion is thus composed of mosaic small spots of light of different densities each consisting of a small image of the entrance pupil formed by one of the lenses.

In order to view, project or contract print the exposed developed film, light is simply directed onto the side of the film containing the lenses (away from the emulsion). If high contrast is desired in this viewed or projected image, a viewing or projecting optical system is employed that has a relative aperture numerically equal to or greater than the one used for exposure, and if low contrast is desired, an optical system in which the reverse is true can be employed. Thus, this film has the advantage of providing variable contrast depending on the aperture of the optical system in which it is used.

One of the principal applications for film of the type shown in FIG. 1 will be in the field of astronomy where exposure times are used to detect faint stellar objects. The maximum exposure that can be used varies with the film temperature and time, but in general is limited by the failure of the reciprocity law of photographic material which states that the density which can be achieved in a photographic emulsion is proportional to the exposure energy per unit area and is independent of the exposure time per se. This rule is valid over a wide range of exposures, but fails for very short and very long exposure times because at low illuminances and long exposure times, the latent image begins to decay at the same rate that it is being formed and nothing is gained by continued exposure. Since film of the type shown in FIG. 1 can reduce the required exposure time by a factor of 1/10 to 1/100 compared to presently used film, it permits photographs to be made, for example, in the field of astronomy which cannot be made with presently used film even with long exposures.

The inherent resultant power of the film depends on a number of factors among which the lens size is one of the most important. If spherical glass beads are used, such beads down to 0.002 inch diameter can be commercially obtained and these beads provide a resolution of about 10 line pairs per millimeter. Such resolution is more than adequate for low level astronomy, graphic art applications and many camera and projector systems. For holographic applications, however, smaller bead diameters are generally desirable in order to achieve spatial frequencies in the range of 100 to 1,000 cycles per millimeter.

Figure 2:
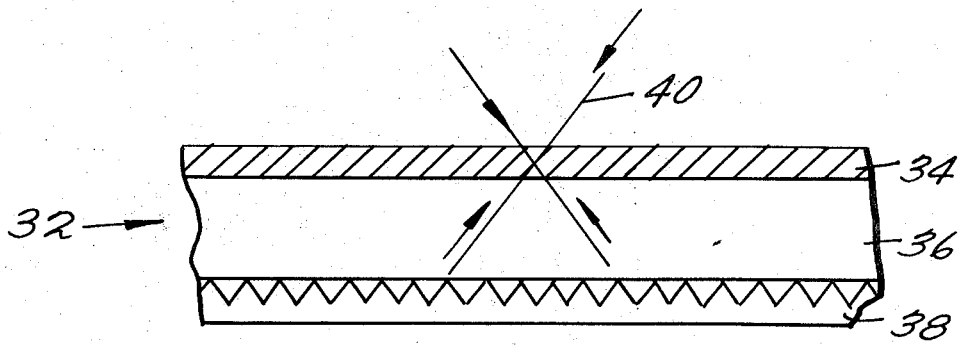
FIG. 2 shows a cutaway view of film according to this invention wherein a plurality of such lenses are disposed adjacent a layer of film for reflecting light passing through the film and impinging upon the lenses back through the film along the incident path.

Reference is now made to FIG. 2 which shows a film 32 which is comprised of an emulsion layer 34, a substrate 36 and a layer 38 of retroreflecting material which may be the same as layer 26 illustrated in FIG. 1 and which functions in the same manner as layer 26. Layer 38 serves as an antihalation layer for photographic films or plate and, in contrast to conventional anti-halation layers which absorb and therefore waste light which passes through the film, layer 38 reflects the light rays which pass through the sensitized emulsion back along their same path to in effect at least double the photographic speed of the film. Anti-halation layers, such as layer 38 in FIG. 2 or layer 26 in FIG. 1, can be employed either in combination with a layer such as 22 in FIG. 1 or alone.

Retroreflecting material is, of course, well known and has been used for many years in a variety of applications. One widely available material is simply a tape comprised of reflecting material having a number of small glass beads bonded to it, so that incident light which impinges upon any of the beads is essentially reflected back along the path it travelled to that bead. Layer 38 may be a tape of this type of material or it may comprise a plurality of any type of small lenses disposed upon a suitable reflecting material.

Accordingly, light which passes through the sensitized emulsion 34, for example, along line 40 continues through the light transmitting substrate 36 and impinges upon retroreflecting layer 38. The lens upon which the light impinges transmits the light to a reflecting layer and similarly transmits and directs the reflected light back along the same path 40 so it again passes through emulsion 34 at the same location and angle to thereby double the light which is incident upon that location. Because of quantum effects, this double passage of the light may more than double the speed of the film.

Figure 3:
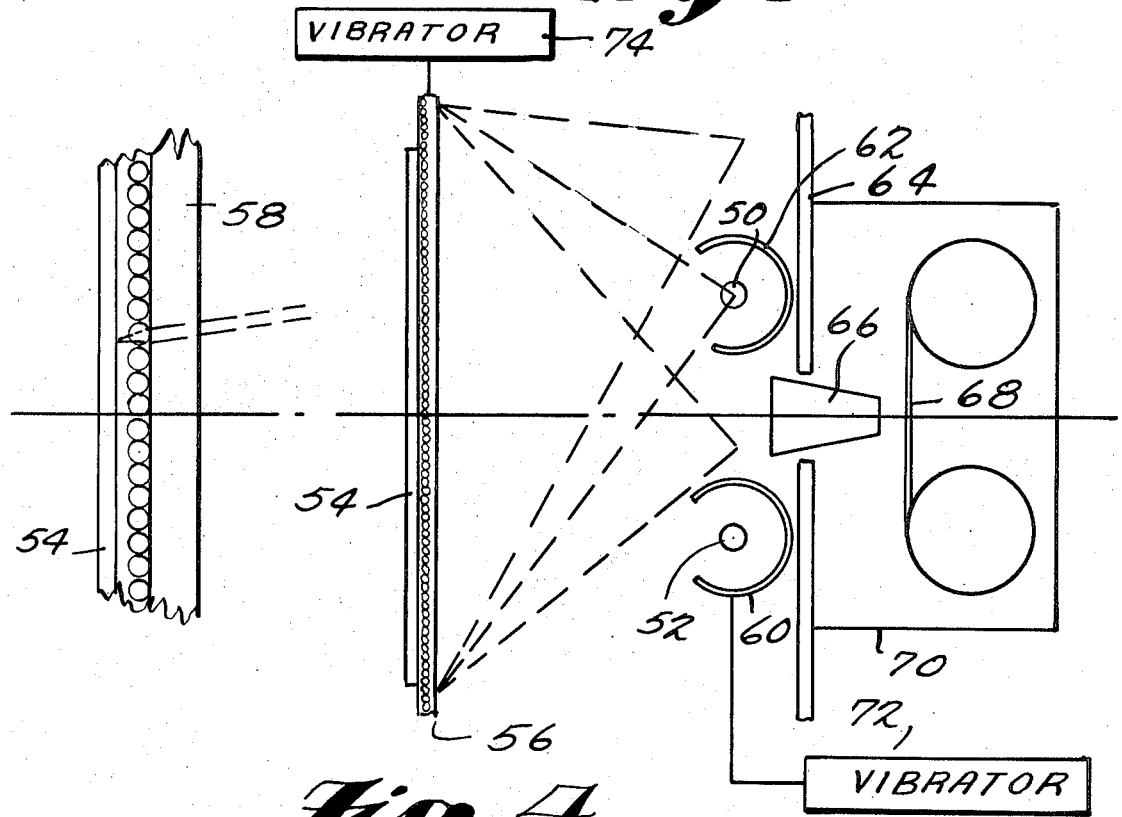
FIG. 3 shows a schematic view of a first embodiment of the camera of this invention wherein a plurality of lens elements are disposed adjacent the surface to be reproduced.

Reference is now made to FIG. 3 which shows a first embodiment of the novel camera of this invention. As mentioned briefly above, the light gathering effectiveness of the camera can be considerably enhanced by disposing a plurality of lenses such as small light transmitting spheres or cylindrical lenses adjacent the surface to be photographed, for example, a document. It has been determined experimentally that the effective light gathering power of a camera by this approach can be increased by a factor of 75 times or more. Such an increase makes practical a direct microfilm document camera for use with film such as the type of film known as Kalvar and described in U.S. Pat. Nos. 3,032,414, 3,161,511 and 3,251,690, the disclosure of which is explicitly incorporated herein by reference. Such films are too slow to be practically employed in a direct camera.

In the embodiment of FIG. 3, light from two light sources 50 and 52 is directed toward a document 54 having a pattern which it is desired to reproduce. A screen 56, which has disposed thereon a plurality of focusing lenses and which may be a grating, a plastic substrate holding a plurality of cylindrical or spherical lenses or any other suitable arrangement, is disposed in contact with document 54 and between document 54 in light sources 50 and 52.

Light impinging on any of the individual lens elements which comprise screen 56 is focused onto an area of document 54 which is substantially smaller in extent than the area onto which the light would be incident in the absence of the screen. In FIG. 3, screen 56 comprises a light transparent, for example, plastic substrate 58 which serves to hold a plurality of individual lenses in place. Light reflectors 60 and 62 prevent transmission of the light output of sources 50 and 52 in directions which would not impinge upon the document. Further, a retroreflecting screen 64 of the material described above is preferably disposed behind reflectors 60 and 62, as shown, in order to further direct all available light onto document 54.

As mentioned above, light which impinges upon screen 56 and is focused by each of the individual lens elements onto a reduced area of the document 54 is reflected from the document and directed by the same transmitting lens element back along roughly the same path that it travelled to the lend. However, some spreading of the reflected light from that path is unavoidable and in fact the invention would not operate without at least some such spreading. Because of this spreading, camera lens 66 receives light reflected from each of the locations adjacent each of the lens elements and focuses an image on film 68 which is contained in a conventional housing 70, and which is conventionally moved and positioned.

Accordingly, the plurality of lens elements which are placed adjacent to the document increase the flux per unit solid angle of projected area of the document. Since the illuminance (flux per unit area) on the film in a camera depends on and only on the F number and transmission coefficient of the camera lens and upon luminance (brightness), it follows that an increase in the luminance of the object increases the luminance of the film and thereby shortens the exposure time required to achieve a given photographic density on the film. As mentioned above, a 75 fold increase in luminance is possible with this invention, and this shortens the exposure time to 1/75 of its original value, thus making practical the use of films having slow exposure time such as the above mentioned Kalvar film.

The illuminating light source or sources for this camera lens should obviously be located as close to the camera lens as possible since the efficiency of the camera depends in part on the ratio of the area of the entrance pupil of the camera lens to the area of the smallest circle, in a plane perpendicular to the camera axis that inscribes the light source and the camera entrance pupil. The more compact the light source, and the closer it is to the camera axis, the greater will be the luminance on the flux.

The required beam spreading can be achieved in any number of ways. First, the unavoidable aberrations in the lenses, particularly if the lenses are glass beads, will cause some spreading. Second, the document can be displaced with respect to the ideal focal plane of the beads, and third the beads can be made small enough so that diffraction effects will prevail. In this latter case, a spread of 0.153 radians can be achieved with a bead diameter of approximately $1.6 \times 10^{-4}$ inches. At this lens diameter and at camera reduction ratios of 20 times, which is standard for a 16 millimeter microfilm, the images of the lenses will be 0.2 micron which in most instances will allow a resolving power of over 2,000 line pairs per millimeter. The resolution of the camera is, however, limited to approximately 150 to 200 line pairs per millimeter by the camera lens and the film itself so that the lenses have virtually no resolving effect upon the system itself.

Further, the resolution of the system can be improved by vibrating or "dithering" the lenses with respect to the light source or vibrating the light source with respect to the bead. In FIG. 3, a suitable vibration source for the lights 50 and 52 is provided, together with a vibrator 74 for jiggling the lenses in screen 56 during exposure.

While the use of spherical beads is satisfactory, cylindrical lenses may be more desirable, although the theoretical gain is somewhat less. In many instances it may be easier to approach the theoretical gain for cylindrical lenses than for spherical ones.

Figure 4:
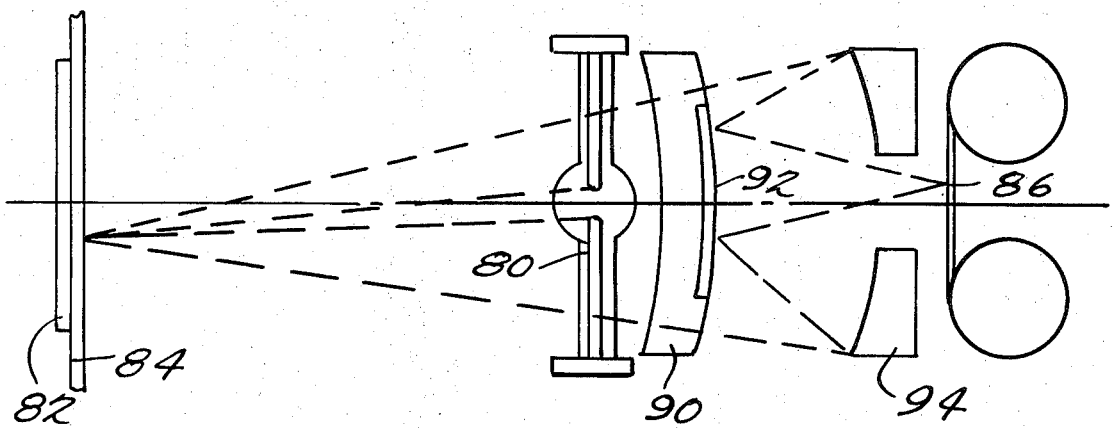
FIG. 4 shows a further embodiment of the camera of this invention.

FIG. 4 illustrates a further embodiment of the invention in which light from a suitable source, in this instance a short arc mercury lamp 80 is directed onto a document 82 to be copied via a screen 84 having disposed thereon a plurality of small lens elements. However, in this embodiment, the annular light spread of the return beam is designed to match the entrance pupil of the reflecting lens system so that most of the light reflected from document 82 falls into the annular entrance pupil of the camera lens onto film 86. Lens system 88 comprises a first lens 90 having a central region 92 which does not transmit light from source 80, which has its arc adjacent the central portion 92 of lens 90, but which reflects light impinging on the area 92 from the direction of film 86. Accordingly, light reflected from document 82 is transmitted through lens 90 except at the central obstructed portion and is reflected from lens 94, which has a central annular opening, onto the central portion 92 from which it is reflected directly onto the film 86 as shown.

Figure 5:
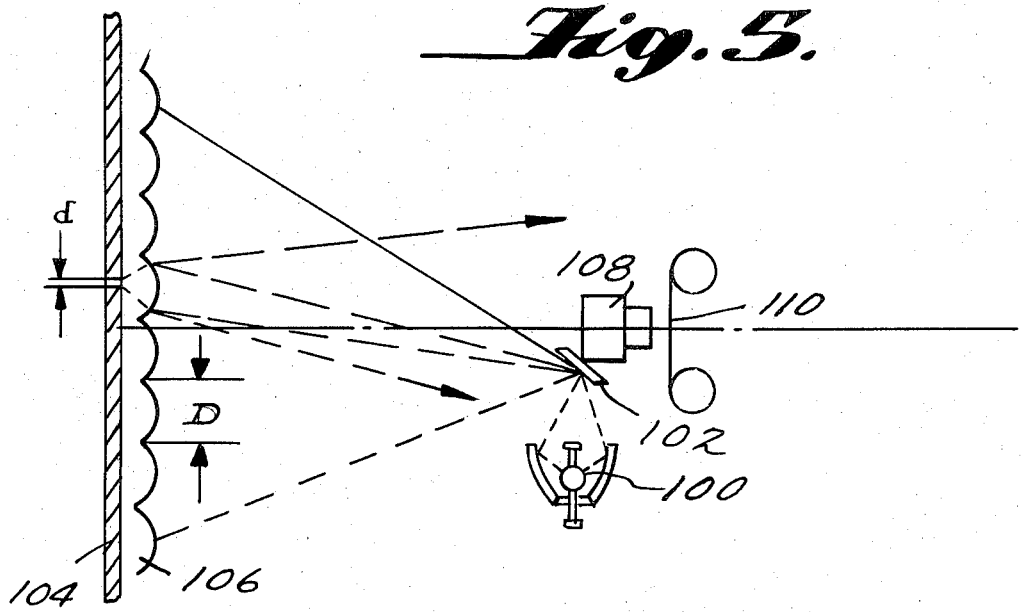
FIG. 5 shows yet another embodiment of the camera of this invention.

FIG. 5 illustrates a further embodiment of the invention in which light from a mercury arc lamp 100 is directed via a mirror 102 to the document 104 via screen 106, which in this embodiment is comprised of a plurality of cylindrical lenses. Light returning from screen 106 is focused by conventional camera lens 108 onto the film 110. The gain is equal to or less than the square of the ratio $D/d$.

Figure 6:
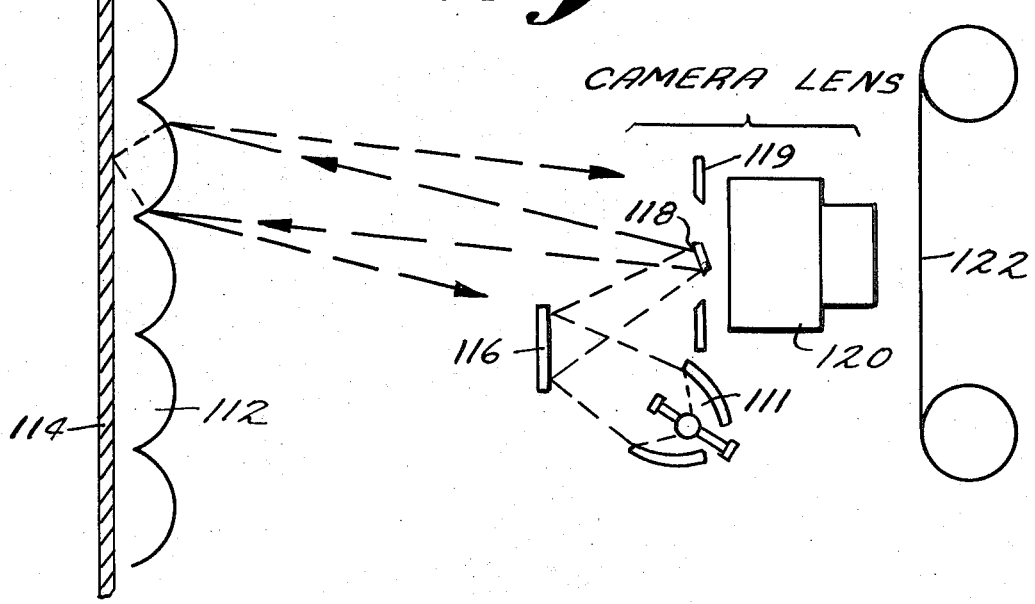
FIG. 6 shows another embodiment of the camera of this invention.

FIG. 6 illustrates a similar embodiment in which the light from the short arc mercury lamp 111 is directed to the lens screen 112 and the document 114 mounted adjacent to it by means of mirrors 116 and 118. The light returning from the lens, except that blocked by mirror 118 and stop 119 is gathered by lens 120 and focused conventionally on film 122 in the same manner as in the other embodiments as discussed above.

In order to reduce the required beam spread, a camera with an external pupil is used in this embodiment, and the amount of spread of the radiated flux from the screen is designed to be contained within the entrance pupil of the lens so that most of the flux reradiated from the document falls into the annular entrance pupil of the lens and substantially the only light wasted is that which falls on the mirror at the center. The condenser for this system can be designed such that at least 50 percent of the total flux emitted by the lamp is delivered to the screen.

The screens which hold the plurality of lens elements in position can be any of a number of different types and such lens screens are commercially available. It is desired that the screens have at least 100 lenses per square inch, for example, molded in or on the surface of a plastic sheet. Densities of 200 to 300 lenses per inch may be desirable.

One technique for manufacturing suitable screen uses are holography techniques with coherent light sources. One suitable grating having excellent quality up to 1,600 lines per millimeter can be produced by exposing a silver film to a reference beam and two point objects. After the film is developed, bleached and tanned, a grating is formed having grating lines which combine surface relief with periodic refractive index variations and accordingly constitute farily good cylindrical lenses. To make a spherical rather than a cylindrical lens by this approach, a double exposure of the film is required, one with the object points on a horizontal line and the other with them on a vertical lines.

A further technique is to embed spherical glass lenses in a plastic matrix. However, the sperical lenses thus formed exhibit low contrast images because of strong internal reflections which may be difficult to eliminate. In the case of holographic and molded plastic screens, internal reflection is not a significant problem because both top and bottom surfaces can be anti-reflection coated with magnesium fluoride, whereas, coating glass lenses may not be practical.

A further technique which can be used to manufacture lens screens comprises winding a plastic fiber of a suitable material onto a cylindrical mandrill under controlled temperature and tension. The temperature and tension are adjusted such that adjacent turns of the fiber fuse together to form a cylindrical sheet around the mandrill and such that the fiber is deformed into a plane on the bottom surface where it contacts the mandrill. After winding is completed, the sheet is slit along a line parallel to the axis of the mandrill and flattened into a plane. Since high quality fibers are available to diameters down to .005 inch, this method affords the possiblity of manufacturing exceedingly fine cylindrical lens sheets of high image quality.

Many changes and modifications in the above embodiment of the invention can, of course, be made without departing from the scope of the invention. Accordingly, that scope is intended to be limited only by the scope of the appended claims.

What is claimed is:

1. A camera for reproducing a pattern on a surface comprising:
means for directing light not forming an image onto said surface, a plurality of lens means disposed adjacent said surface for focusing the light incident upon each said lens means onto an area of said surface which is smaller than the area upon which the light would be incident if that lens means was absent and for directing focused light reflected from said smaller areas of said surface back along paths which are roughly the same as and relatively close to the path travelled to that lens means by the reflected light, so that substantially no light is reflected from the remainder of said surface including a light source and a mirror disposed in an external pupil for reflecting light from said source onto said surface,
means for holding film, and
means for directing at least a portion of the light reflected from said plurality of lens means onto said film so as to reproduce said pattern on said film, including a lens having said external pupil for focusing light received from said plurality of lens means onto said film.

2. A camera as in claim 1 wherein each said lens means is a cylindrical lens disposed with its axis substantially parallel to the adjacent portion of said surface.

3. A camera as in claim 2 wherein said cylindrical lenses are formed as grating lines on a sheet of material.

4. A camera as in claim 1 wherein each said lens means is a spherical bead.

5. A camera as in claim 1 further including screen means for mounting said plurality of lens means and wherein the density of said lens means on said screen means is at least 100 lenses per square inch.

6. A camera as in claim 1 wherein said reflected light directing means includes a lense system and said surface light directing means includes at least a single light source mounted adjacent said lens.

7. A camera as in claim 6 wherein said reflected light directing means further includes reflecting means adjacent said light source for reflecting incident light toward said surface.

8. A camera as in claim 7 wherein said reflecting means includes a plurality of further lens means which each reflect incident light back along roughly the path it travelled to that lens means.

9. A camera as in claim 1 further including a light source.

10. A camera as in claim 1 wherein said reflected light directing means includes a lens having an external pupil for focusing light received from said plurality of lens means onto said film, and wherein said surface light directing means includes a light source and a mirror disposed in said pupil for reflecting light from said source onto said surface.

11. A camera as in claim 1 wherein said lens means are disposed in a matrix and wherein said matrix is coated on both sides with magnesium fluoride.

12. A camera for reproducing a pattern on a surface comprising:
means for directing light not forming an image onto said surface, a plurality of lens means disposed adjacent said surface for focusing the light incident upon each said lens means onto an area of said surface which is smaller than the area upon which the light would be incident if that lens means was absent and for directing focused light reflected from said smaller areas of said surface back along paths which are roughly the same as and relatively close to the path travelled to that lens means by the reflected light, so that substantially no light is reflected from the remainder of said surface
means for holding film,
means for directing at least a portion of the light reflected from said plurality of lens means onto said film so as to reproduce said pattern on said film, and means for vibrating said surface light directing means with respect to said lens means.

13. A camera for reproducing a pattern on a surface comprising:

means for directing light not forming an image onto said surface, a plurality of lens means disposed adjacent said surface for focusing the light incident upon each said lens means onto an area of said surface which is smaller than the area upon which the light would be incident if that lens means was absent and for directing focused light reflected from said smaller areas of said surface back along paths which are roughly the same as and relatively close to the path travelled to that lens means by the reflected light, so that substantially no light is reflected from the remainder of said surface means for holding film, means for directing at least a portion of the light reflected from said plurality of lens means onto said film so as to reproduce said pattern on said film, and means for vibrating said lens means with respect to said surface light directing means.

14. A camera for reproducing a pattern on a surface comprising:

means for directing light not forming an image onto said surface, a plurality of lens means disposed adjacent said surface for focusing the light incident upon each said lens means onto an area of said surface which is smaller than the area upon which the light would be incident if that lens means was absent and for directing focused light reflected from said smaller areas of said surface back along paths which are roughly the same as and relatively close to the path travelled to that lens means by the reflected light, so that substantially no light is reflected from the remainder of said surface including at least a single light source mounted adjacent said lens means means for holding film, and means for directing at least a portion of the light reflected from said plurality of lens means onto said film so as to reproduce said pattern on said film, including a lens system, said lens system including a first lens having a non-light transmitting region with respect to light incident from the direction of said surface and reflecting from the direction of said film and a light transmitting region and at least a second lens for reflecting light transmitted through said light transmitting region from said surface onto said non-light transmitting and reflecting region so that it is reflected onto said film and wherein said source is disposed adjacent said non-light transmitting and reflecting region of said first lens and between said first lens and said plurality of lens means.

15. A camera as in claim 14 wherein said light source is an arc mercury lamp having its arc disposed adjacent said non-transmitting and reflecting region.

16. A method of reproducing a pattern on a surface comprising the steps of:

providing adjacent said surface a plurality of light transmitting lens means for focusing the light incident upon each said lens means onto an area of said surface which is smaller than the area upon which the light would be incident if that lens means was absent, directing light not forming an image from a source onto said lens means so that said light is focused onto said smaller areas and so that light reflected from said smaller areas of said surface only is directed by said lens means along paths which are roughly the same as and relatively close to the path travelled to that lens means by the reflected light and substantially no light is reflected from the remainder of said surface, and directing at least a portion of said reflecting light onto a film so as to reproduce said pattern.

17. A method as in claim 16 further including the step of vibrating said lens means with respect to said source.

18. A method as in claim 16 further including the step of vibrating said source with respect to said lens means.

19. A method of reproducing a pattern on a surface comprising the steps of:

directing light not forming an image from a light source onto a plurality of lens means disposed adjacent said surface so that each said lens means focuses incident light into an area of said surface which is smaller than the area upon which the light would be incident if that lens means was absent and directs focused light reflected from said smaller areas of said surface back along paths which are roughly the same as and closely adjacent the path travelled to that lens means by the reflected light, and substantially no light is reflected from the remainder of said surface, and disposing film so that at least a portion of the light reflected from said plurality of lens means is incident upon said film so as to reproduce said pattern on said film.

20. A method as in claim 19 including the further step of vibrating said lens means with respect to said light source while said light is being directed onto said lens means.

21. A method as in claim 19 including the further step of vibrating said light source with respect to said lens means while said light is being directed onto said lens means.

22. A method as in claim 19 including the step of disposing a lens between said plurality of lens means and said film for focusing said reflected light onto said film.

* * * * *